United States Patent [19]

Fujii et al.

[11] 4,277,774

[45] Jul. 7, 1981

[54] BILL DISCRIMINATING APPARATUS

[75] Inventors: Kiyoshi Fujii; Keiji Tsuji; Seiya Nishimoto, all of Tokyo, Japan

[73] Assignee: Laurel Bank Machine Co., Ltd., Tokyo, Japan

[21] Appl. No.: 69,768

[22] Filed: Aug. 27, 1979

[30] Foreign Application Priority Data

Aug. 28, 1978 [JP] Japan ................................ 53-104752

[51] Int. Cl.[3] ........................ G06K 7/12; G01N 21/30

[52] U.S. Cl. ............................ 340/146.3 Q; 194/4 R; 235/454; 250/372; 250/567; 340/146.3 B

[58] Field of Search ............... 194/4 R, 4 E; 209/534, 209/577, 578; 235/454; 250/567, 565, 572; 340/146.3 Q, 146.3 R, 146.3 F, 146.3 B

[56] References Cited

U.S. PATENT DOCUMENTS

| | | | |
|---|---|---|---|
| 2,951,164 | 8/1960 | Timms | 194/4 R |
| 3,480,785 | 11/1969 | Aufderheide | 194/4 R |
| 3,496,371 | 2/1970 | Endo | 250/567 |
| 4,114,804 | 9/1978 | Jones et al. | 194/4 R |

*Primary Examiner*—Leo H. Boudreau
*Attorney, Agent, or Firm*—Fleit & Jacobson

[57] ABSTRACT

There is provided a bill discriminating apparatus which utilizes the presence of a light-emitting substance in a printed zone of the bill when irradiated with ultraviolet rays. The bill discriminating apparatus comprises an ultraviolet ray-emitting member for irradiating a bill to be discriminated, a photoelectric converter element for receiving light rays emitted from a light-emitting substance in a printed zone of the bill when the light-emitting substance is irradiated with ultraviolet rays, and a discriminating circuit for checking pattern signals of the light-emitting substance, which signals are delivered by said converter element.

5 Claims, 4 Drawing Figures

BILL DISCRIMINATING APPARATUS

BACKGROUND OF THE INVENTION

1. Field of the Invention

The present invention relates to a bill discriminating apparatus for discriminating genuine bills from counterfeit bills by irradiation of ultraviolet rays in a money exchange machine or the like.

2. Description of the Prior Art

As a conventional bill discriminating method, there can be mentioned a method in which the magnetic distribution of a magnetic substance contained in a printed zone of a bill or the optical distribution of color or its density is converted to electric signals and these electric signals are analyzed for discrimination. Accordingly, if a bill to be discriminated does not contain a magnetic substance, discrimination can be performed only by optical means. In this case, counterfeit bills produced by using recently developed multi-color copying machines cannot be discriminated from genuine bills.

SUMMARY OF THE INVENTION

It is a primary object of the present invention to provide a high-precision bill discriminating apparatus in which the foregoing defect encountered in the conventional technique is eliminated. Namely, it was noted that a substance emitting light under irradiation of ultraviolet rays is contained in a printed zone of a certain kind of bill, and the above problem was solved by electrically analyzing the distribution of this light-emitting substance.

Generally, detection of this light-emitting substance is very difficult under sunlight or ordinary illumination, and using a copying machine to produce a counterfeit bill including the distribution of the light-emitting substance is very difficult. Therefore, bills containing the light-emitting substance can be reliably discriminated.

More specifically, in accordance with the present invention, there is provided a bill discriminating apparatus comprising an ultraviolet ray-emitting member for irradiating a bill to be discriminated, a photo-electric converter element for receiving light rays emitted from a light-emitting substance in a printed zone of the bill, and a discriminating circuit for checking pattern signals of the light-emitting substance when the light-emitting substance is irradiated by ultraviolet rays, which signals are delivered by the converter element.

BRIEF DESCRIPTION OF THE DRAWINGS

Other objects and advantages of the present invention will become apparent from the following description made with reference to the accompanying drawings, in which.

DETAILED DESCRIPTION OF THE PREFERRED EMBODIMENTS

The present invention will now be described in detail with reference to embodiments illustrated in the accompanying drawings.

Figure 1:
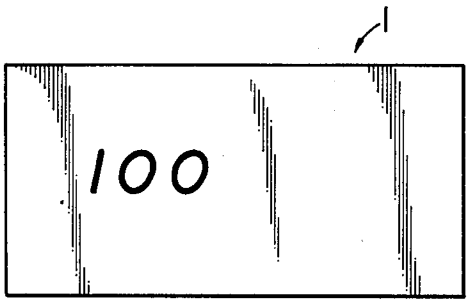
FIG. 1 is a view illustrating a bill to be discriminated, which bill contains in a printed portion a substance that emits light when irradiated with ultraviolet rays.

Referring to FIG. 1 illustrating the optical system of the bill discriminating apparatus according to the present invention, reference numeral 1 represents a bill which contains in a printed zone a letter or figure of a substance that emits light when irradiated with ultraviolet rays, reference numeral 2 represents a mercury lamp acting as an ultraviolet ray-emitting member, reference numeral 3 represents an ultraviolet ray transmitting filter, reference numeral 5 represents a slit, and reference numeral 6 represents a photoelectric converter element. The light-emitting substance in the printed zone is irradiated with ultraviolet rays from the mercury lamp 2, and light rays emitted from the light-emitting substance are received by the photoelectric converter element 6 that delivers electric pattern signals of the light-emitting substance in the printed zone. The spectrum distribution range of the mercury lamp 2 includes not only ultraviolet rays but also visible rays. The visible rays are reflected from the bill 1 and reach the photoelectric converter element 6 to cause fogging of patterns. In order to avoid this disadvantage, the ultraviolet ray transmitting filter 3 is disposed in front of the mercury lamp 2 so that the bill 1 is irradiated with ultraviolet rays alone. On the other hand, since the received ray distribution range of the photoelectric converter element 6 covers even the ultraviolet ray region, ultraviolet rays reflected from the bill 1 arrive at the converter element 6 to cause fogging of patterns. In order to avoid this disadvantage, a visible ray transmitting filter 4 for cutting ultraviolet rays is disposed in front of the photoelectric converter element 6. The slit 5 is arranged between the photoelectric converter element 6 and the visible ray transmitting filter 4, and the width of the slit 5 is made substantially equal to the line width of the letter or figure so as to enhance pattern resolving power and obtain a clearer signal. Reference numeral 7 represents an optical system for detecting the presence or absence of a bill. A light-emitting element and a light-detecting element are disposed on both sides of the passage for transfer of the bill 1, respectively, so that they confront each other. When the bill 1 is delivered to the bill transfer passage to interrupt the optical path between the two elements, the light-detecting element emits a signal indicating the presence of the bill.

Figure 2:
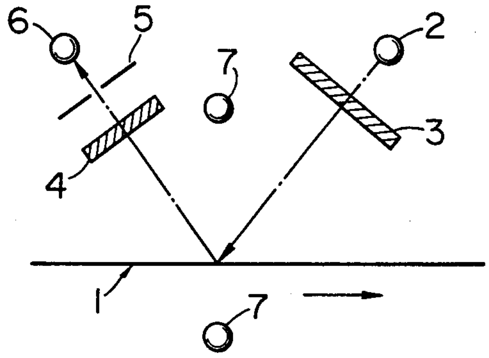
FIG. 2 is a view illustrating one embodiment of the optical system in the bill discriminating apparatus according to the present invention.
Figure 3:
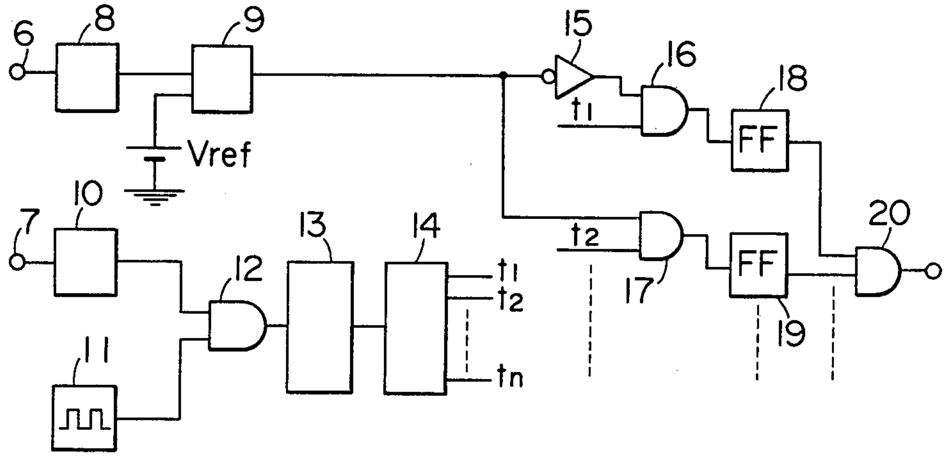
FIG. 3 is a view illustrating one embodiment of the discriminating circuit in the bill discriminating apparatus according to the present invention.

FIG. 3 illustrates a bill discriminating circuit connected to the optical system shown in FIG. 2. When the bill 1 to be discriminated is moved in the direction indicated by the arrow in the optical system shown in FIG. 2, an electric pattern signal (see FIG. 4-*a*) of the light-emitting substance subjected to irradiation of ultraviolet rays, which signal is generated by the photoelectric converter element 6, is compared against a pattern of check pulses (see FIG. 4-*d*) generated by the discriminating circuit, thereby to judge whether the bill is genuine or conterfeit.

When the bill to be discriminated is moved at a constant speed in the bill transfer passage, the pattern signal (see FIG. 4-*a*) is generated by the photoelectric converter element 6, and supplied to an amplifier 8 where it is amplified and then fed to a voltage comparator 9. In the voltage comparator 9, the voltage level of the pattern signal is compared with the reference voltage Vref (see FIG. 4-*a*). A pattern signal exceeding this reference voltage Vref is rectified to generate output pulses (see FIG. 4-*b*).

Figure 4:
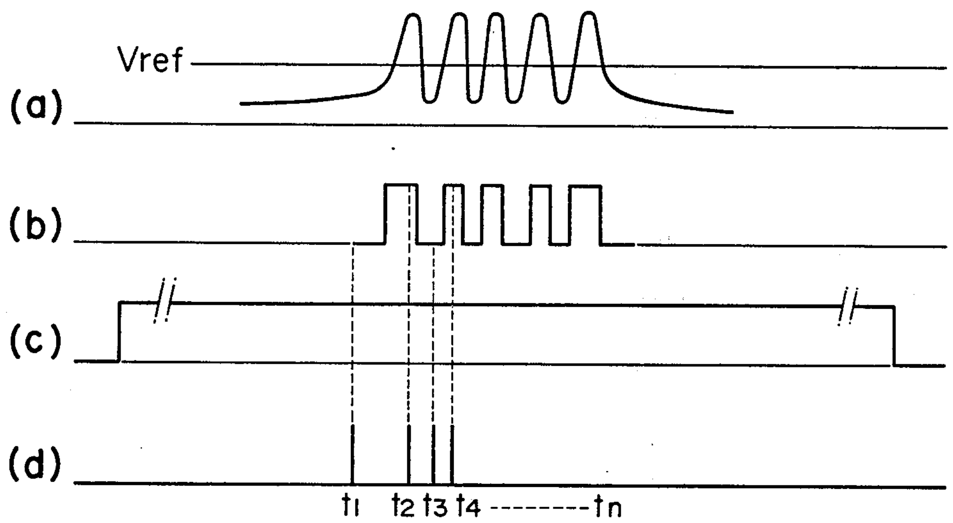
FIG. 4 is a view illustrating operation wave forms of the respective parts of the optical system and discriminating circuit shown in FIGS. 2 and 3.

In the optical system 7 for detecting the presence or absence of a bill, a gate signal (see FIG. 4-*c*) is generated when the bill to be discriminated is present in the discriminating apparatus. The gate signal is amplified by an amplifier 10 and applied to an AND circuit 12 as one input. A clock signal as the other input to the AND circuit is supplied from a clock circuit 11. Accordingly, the clock signal is supplied to a counter circuit 13 from the AND circuit 12 only when the bill is present in the discriminating apparatus. The count in the counter circuit 13 corresponds to the position of the bill if the clock frequency and bill feed speed are kept constant. A decoder circuit 14 generates a check pulse (see FIG. 4-*d*) to check the pattern position of the bill based on the count. More specifically, since pattern signals (see FIG. 4-*a*) are sequentially generated at certain time intervals at a certain bill transfer speed, the above check pulse is generated in the decoder circuit 14 every time a corresponding count is reached. Referring to FIGS. 4-*a* and 4-*b*, check pulses are generated according to the signal pattern corresponding to the light-emitting substance in the printed zone of a genuine bill sequentially, that is, at the point t1 just before generation of the output pulse of the first pattern signal, the point t2 for generation of the first output pulse, the point t3 intermediate between the point t2 and the point for generation of the second output pulse, and the point t4 for generation of the second output pulse.

Such check pulses (see FIG. 4-*d*) and signal pattern output pulses (see FIG. 4-*b*) are sequentially supplied to corresponding AND circuits. At the time t1, the signal pattern output pulse is at a low level, that is, one of two logic signals differing in level, and is inverted by inverter 15 before being applied as one input to the AND circuit 16. If this output pulse is generated when the check pulse is present, both the inputs as logic signals become "1" so that the output signal goes to logic "1". A subsequent flip-flop circuit 18 is set to signal "1". A time t2, since the output pulse is at the high level, it is directly supplied to an AND circuit 17. Hence, if the output pulse of the high level is supplied when the check pulse at time t2 is present, the output signal from AND circuit 17 becomes "1" and a subsequent flip-flop circuit 19 is set to signal "1". Similarly, when the check pulse at time t3 is present, the output pulse of the low level is inverted and fed to a corresponding AND circuit to set a corresponding flip-flop to signal "1". Thus, at points t4 to tn, pattern signals corresponding to the check pulses are checked by corresponding AND circuits, and when pattern signals of correct levels are received, corresponding flip-flop circuits are set to signal "1". When all the flip-flop circuit corresponding to the points t1, t2, . . . tn are set to signal "1", the output signal of an AND circuit 20 become "1", and a signal indicating a genuine bill is emitted.

As will be apparent from the foregoing illustration, the bill discriminating apparatus of the present invention utilizing ultraviolet rays makes possible complete discrimination between genuine and counterfeit bills by the provision of a novel method for discriminating genuine bills from counterfeit bills. Even forged bills prepared by using a newly developed multicolor copying machine can be completely checked.

What is claimed is:

1. A bill discriminating apparatus for discriminating genuine bills from counterfeit bills by irradiation of ultraviolet rays, said genuine bills having a printed zone containing a light emitting substance having patterns, said apparatus comprising:

an ultraviolet ray-emitting member for emitting an ultraviolet ray and directing it toward a bill to be discriminated, an ultraviolet ray transmitting filter disposed between the ultraviolet ray emitting member and the bill to be discriminated for passing only the ultraviolet ray through the filter, a visible ray transmitting filter for passing only the visible ray reflected from said light emitting substance in said printed zone of the bill when the light emitting substance is irradiated with ultraviolet radiation, a photoelectric converter element for receiving the visible ray passed through the visible ray transmitting filter and for converting the visible ray into electric signals, a slit disposed between the photoelectric converter element and the visible ray transmitting filter for limiting the visible ray passed through the visible ray transmitting filter, and a discriminating circuit for checking said patterns of the light-emitting substance in response to the electric signals of said photoelectric converter element;

wherein said discriminating circuit comprises a first circuit for generating pattern signals from light rays received in said photoelectric converter element, a second circuit for generating a train of pulses corresponding to the pattern signals obtained from a genuine bill, and a third circuit for comparing said pattern signals with said train of pulses.

2. An apparatus as set forth in claim 1, wherein said ultraviolet ray-emitting member comprises a mercury lamp.

3. An apparatus as set forth in claim 1, wherein said pattern signals comprise a train of pulses, each having a relatively large width, and wherein said first circuit comprises an amplifier and a voltage comparator connected to said amplifier.

4. An apparatus as set forth in claim 1, wherein said second circuit generates a train of pulses each having a relatively narrow width and corresponding to the presence and the absence of each pulse of said pattern signals in timed relationship.

5. An apparatus as set forth in claim 1, wherein said third circuit compares the presence of pulses generated from said first circuit with one group of train of pulses generated from said second circuit, and compares the absence of pulses generated from said first circuit with the other group of train of pulses generated from said second circuit and alternately generated from said one group of train of pulses.

* * * * *